United States Patent [19]
Morden

[11] 3,875,820
[45] Apr. 8, 1975

[54] VEHICLE PARKINGS BRAKE POWER OPERATOR

[75] Inventor: Russell L. Morden, Lansing, Mich.

[73] Assignee: General Motors Corporation, Detroit, Mich.

[22] Filed: Jan. 21, 1974

[21] Appl. No.: 434,771

[52] U.S. Cl. .................. 74/512; 74/516; 74/625; 188/162
[51] Int. Cl. ............. G05g 1/14; F16h ; B60l 7/00
[58] Field of Search ............ 74/512, 516, 518, 625; 188/162, 106 P, 106 F; 192/3 R, 2

[56] References Cited
UNITED STATES PATENTS

| | | | |
|---|---|---|---|
| 3,270,840 | 9/1966 | De Claire | 192/3 R X |
| 3,292,452 | 12/1966 | Nordstrom et al | 74/625 |
| 3,348,638 | 10/1967 | Littmann | 188/162 |
| 3,623,380 | 11/1971 | Tomczak | 74/512 X |
| 3,625,087 | 12/1971 | Flory et al. | 74/512 X |

Primary Examiner—Samuel Scott
Assistant Examiner—Lance W. Chandler
Attorney, Agent, or Firm—D. L. Ellis

[57] ABSTRACT

This invention relates to a parking brake system provided with a cyclical power operator which is operative within its first half cycle to drivingly engage and move a pivotally supported lever to apply the parking brake. The power operator is load responsive and disconnects from driving engagement with the lever when the parking brake is applied independently of where said cyclical power operator is within its first half cycle when the parking brake is applied. Thereafter, the power operator by completing its full cycle disconnected from driving engagement with the lever is reset for recycling before the parking brake is released. A circuit energizes the power operator for one full cycle and therefore deenergizes the power operator.

4 Claims, 7 Drawing Figures

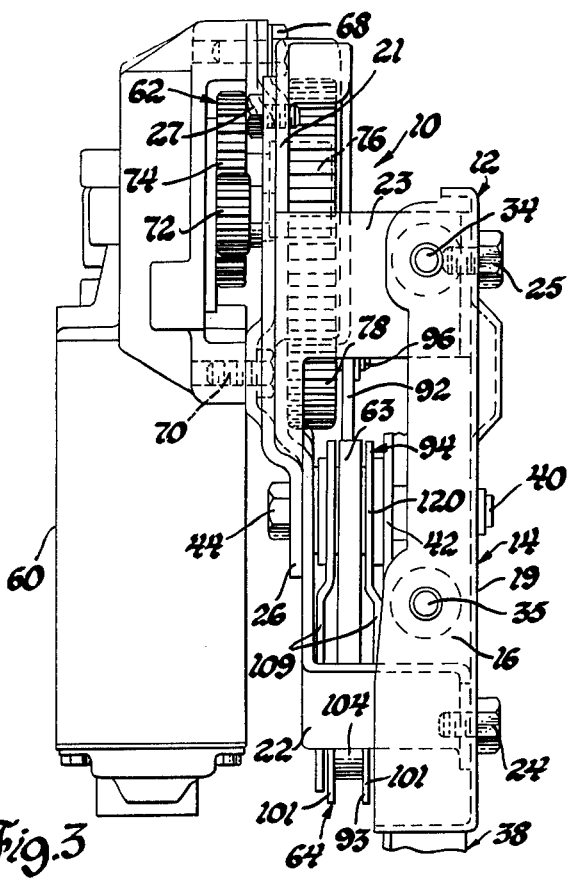
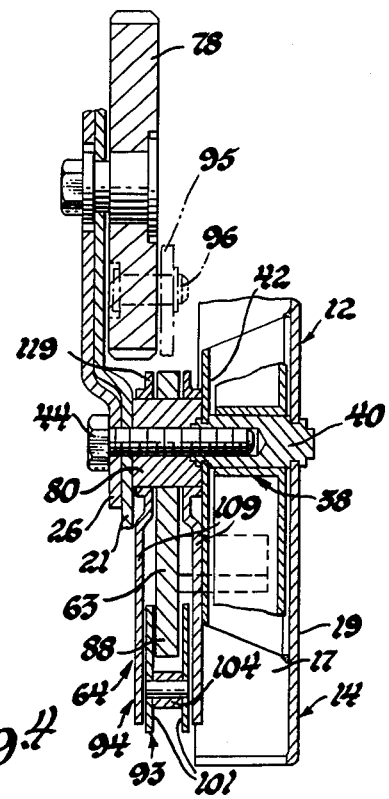
Fig.3
Fig.4
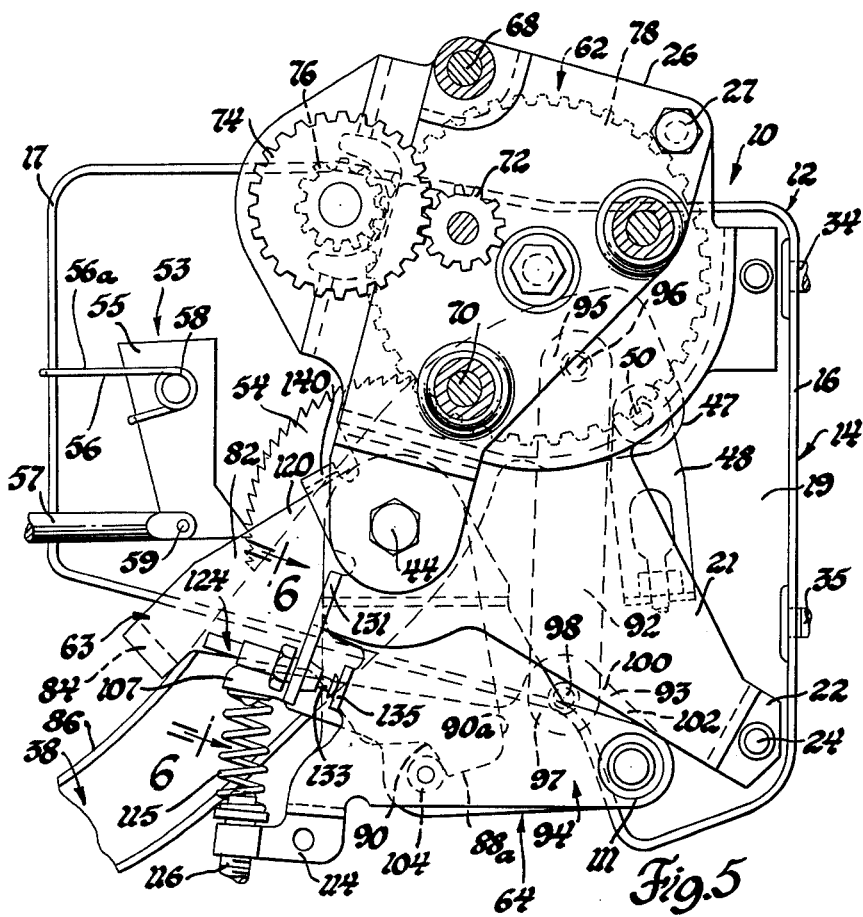
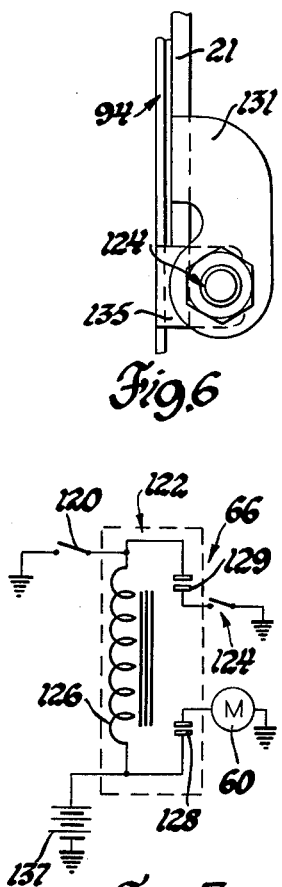
Fig.5
Fig.6
Fig.7

VEHICLE PARKINGS BRAKE POWER OPERATOR

The present invention relates to vehicle parking brake systems and, more particularly, to a vehicle parking brake system provided with a power operator.

The vehicle parking brake systems generally comprise a pivotally supported lever within the passenger compartment of a vehicle which is operatively connected by a wire or a cable with the rear wheel brakes of the vehicle. The lever is movable by the operator of the vehicle between a brake release position and a brake apply position, in which it is normally retained by a releasable ratchet mechanism. In order to move the lever to its brake apply position to apply the parking brake, a predetermined force must be applied to the lever to overcome the spring load of the brakes. Because of inherent variations in the physical characteristics of brakes as a result of brake adjustment and use, the exact position to which the lever is moved upon application of the predetermined force can vary both in one vehicle and from one vehicle to the next.

Power operators for parking brake systems have heretofore been provided which comprise an electric motor and a gear arrangement which when driven in one direction serves to apply the parking brake and which when reversed to be driven in the opposite direction releases the parking brake. For example, see U.S. Pat. Nos. 2,725,131 to Martin, issued Nov. 29, 1955; 3,353,634 to Farrar, issued Nov. 21, 1967, 3,481,434 to Evans, issued Dec. 2, 1969 and 3,593,815 to Inoue, issued July 20, 1971. In another power operator parking brake system, a motor is energized to drive a worm and worm gear in one direction to axially shift a rod from a brake release position to apply the parking brakes; the worm, worm gear, and motor are run in reverse and reset for recycling when the rod returns to its brake release position under the spring load of the brakes. For example, see U.S. Pat. No. 3,348,638 to Littmann, issued Oct. 24, 1967.

Further, power operators for vehicle parking brake systems, as described immediately above, have heretofore been provided with mechanical torque responsive mechanisms which serve to disconnect a motor and gear arrangement from driving enagement with a parking brake actuator when a predetermined force has been applied to the actuator to apply the parking brakes and wherein the mechanical torque responsive mechanism immediately deenergizes the motor when the actuator is moved to its brake apply position. For example, see U.S. Pat. No. 3,455,418 to Littmann, issued July 15, 1969.

Power operators for vehicle parking brake systems have also heretofore been provided wherein a motor driven gear train cooperates with a sector gear on the lever to move the lever to apply the parking brakes and wherein the motor is deenergized by a current responsive relay which senses the increased load on the motor when the parking brake is applied. For example, see U.S. Pat. No. 3,270,840 to DeClaire, issued Sept. 6, 1966.

A principal feature of the present invention is to provide a new and improved power operator for a vehicle parking brake system which moves a parking brake lever to apply the parking brakes and which is reset for recycling before the parking brake lever and parking brake are released.

Another feature of the present invention, in accordance with the above-described feature, is to provide a new and improved power operator for a vehicle parking brake system wherein the power operator is cyclical and sets the parking brake within the first half cycle and which upon the completion of its full cycle is reset for recycling before the release of the lever and parking brake.

Yet another feature of the present invention, in accordance with the above-described feature, is to provide a new and improved power operator for a vehicle parking brake system which has a drive lever drivingly engageable with the parking brake lever and a linkage with a link which is biased by a spring carried by the linkage into driving engagement with the drive and wherein the link overcomes the bias of the spring to disconnect the link from driving engagement with the drive lever independently of where the cyclical power operator is within the first half cycle when the parking brake is applied.

These and other features of the present invention are accomplished in a preferred embodiment of a parking brake system having a lever which is pivotally supported upon a housing for movement upon application of a predetermined force to apply the parking brake and which is adapted for return movement to release the parking brake, a cyclical power operator which is operative within its first half cycle to drivingly engage and move the lever to apply the parking brake, and with the cyclical power operator having a load responsive means for disconnecting the power operator from driving engagement with the lever when the parking brake is applied, the load responsive means acting independently of where the cyclical power operator is within its first half cycle when the parking brake is applied, thereafter the cyclical power operator by completing its full cycle disconnected from driving engagement with the lever is reset for recycling before return movement of the lever to release the parking brake; and circuit means for energizing the cyclical power operator for one full cycle and thereafter deenergizing the cyclical power operator.

These and other features of the present invention will become more fully apparent from reference to the following detailed description and drawing wherein:

FIG. 3 is an end elevational view of the vehicle parking brake of the system of the present invention and shown in FIG. 1;

FIG. 4 is a cross-sectional view taken approximately along line 4—4 of FIG. 1;

FIg. 5 is the opposite side-elevational view of the parking brake system shown in FIG. 1;

FIG. 6 is a view of a portion of the vehicle parking brake system shown in FIG. 5 and taken approximately along line 6—6 of FIG. 5; and FIG. 7 is a schematic view of the electrical circuit of the vehicle parking brake system of the present invention.

Figure 1:
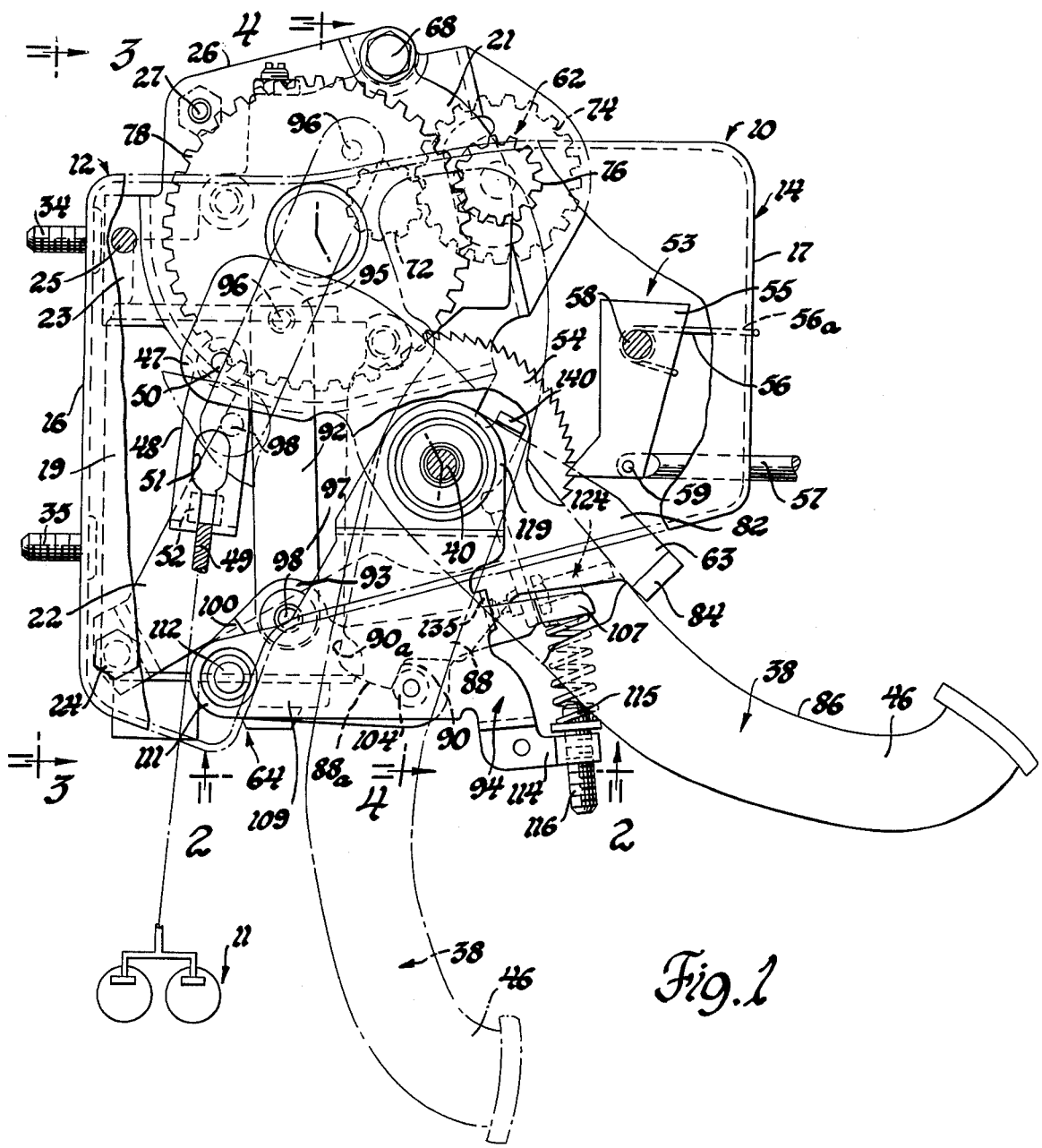
FIG. 1 is a side elevational view of the vehicle parking brake system of the present invention with portions shown schematically and showing the parking brake lever in released and applied positions in solid and broken lines respectively.

Referring to FIG. 1, a vehicle parking brake system is shown which has a parking brake control mechanism 10 that controls the release and application of a vehicle parking brake 11, which is shown schematically and which could comprise the two rear wheel brakes of a vehicle but which could also include the front wheel brakes. The parking brake control mechanism 10 has a housing 12 which can be mounted in any suitable manner adjacent the driver' side of the passenger compartment of an automotive vehicle. Referring to FIGS. 3 and 5, the housing 12 is a three-piece assembly which comprises a base member 14 with end walls 16 and 17 and a side wall 19 and an enclosure member 21 with bracket arms 22 and 23 which are bolted at 24 and 25, respectively, to the base member 14, and a closure plate 26 which overlies the enclosure member 21 and which is bolted thereto, among other places which will later be described, at 27. The housing 12 has the end wall 16 of the base member 14 adapted to be bolted at 34 and 35 to the firewall of the vehicle.

Now referring to FIGS. 1 and 4, the parking brake control mechanism 10 also includes a conventional parking brake lever 38 which is generally U-shaped in cross section and which is pivotally supported upon a pivot pin 40 for movement between a parking brake released position, as shown in FIG. 1, and a parking brake applied position, (same Figure, broken lines). The pivot pin 40 has one end received within an opening in the side wall 19 of the base member 14 of the housing 12 and it is spun over for retention therewith. The pivot pin 40 has its other end received within an opening in a bracket 42 straddling brake lever 38 and spun over for retention. Further, the pivot pin 40 is also supported upon a bolt 44 which has its shank threadably engaged therewith and received within aligned openings in the enclosure member 21 and closure plate 26 of the housing 12. Thus, it should be understood that the bolt 44 and the pivot pin 40 also serve to connect together the enclosure member 21 and the closure plate 26 of the housing 12. The parking brake lever 38 has a lower portion 46 which is adapted to be engaged by the foot of the vehicle operator to move the parking brake lever 38 from its parking brake released position to one of a plurality of parking brake apply positions, shown respectively in solid and broken lines in FIG. 1. The foot pedal lever 38 has an upper portion 47 which is adapted to be operatively connected with the parking brake 11 via an L-shaped link 48 and an actuating wire or cable 49 as shown in FIG. 1. The link 48 is pivotally supported at 50 upon the upper portion 47 of the parking brake lever and has a side opening 51 which is adapted to receive therethrough an enlarged terminal end 52 of the actuating cable 49. The terminal end 52 of the actuating cable 49 is supported upon the lower portion of the L-shaped link 48 and, thus, is connected upon the upper portion 47 of the parking brake lever 38 for movement in response to the shifting of the parking brake lever 38 between its parking brake applied and released positions. It should be understood that the actuating cable 49 is connected in some suitable manner to the movable braking elements (not shown) of the parking brake 11. It should further be understood that the movable braking elements of the brakes 11 are normally spring biased out of engagement with the stationary braking elements (not shown) of the parking brake 11 and that movement of the parking brake lever 38 from its parking brake released position to its parking brake applied position requires the application of a predetermined force to overcome the spring load on the movable elements of the parking brake 11, as well as the load of the return spring element usually associated with the lever to restore it to released position, not shown.

The parking brake lever 38 is retained in a selected brake applied position, as shown in broken lines in FIG. 1, by a ratchet mechanism 53, which could be of any conventional and suitable variety but which may include a sector gear 54 formed on a parking brake lever 38 immediately adjacent the pivot pin 40, a pawl member 55, a torsion spring 56, and a control link 57. The pawl member 55 is pivotally supported upon a pin 58 which is carried by the base member 14 of the housing 12, and the torsion spring 56 is wound about pin 58 and has one end 56a retained within an opening in the end wall 17 of the base member 14 and its other end engaging the pawl member 55 in a manner to bias it into engagement with the sector gear 54. The control link 57, connected at 59 to the pawl member 55, will upon manipulation by the vehicle operator disengage the pawl member 55 from the sector gear 54 against the bias of the torsion spring 56 to allow the parking brake lever 38 to be returned to its parking brake released position, as shown in FIG. 1, by the usual brake lever return spring, not shown.

The parking brake control mechanism 10 of the present invention has a power operator which generally includes a motor unit 60, a gear train 62, a bellcrank lever 63, an operating linkage 64, and a control circuit 66.

Referring to FIGS. 1 and 3, the motor unit 60, which may include any suitable and conventional fractional power DC electric motor such as that typically used for automobile powered accessories, has its housing bolted at 68 to the enclosure member 21 of the housing 12 and bolted at 70 to the enclosure plate 26 of the housing 12.

Now referring to FIGS. 3 and 5, the output shaft of motor 60 is provided internally of its housing with a worm and driven worm gear reduction combination driving a lateral output shaft and on the latter there is further mounted a first spur gear 72. The first gear 72, in turn, drives a larger second spur gear 74 which has a smaller third gear 76, of approximately the same size as the first gear 72, juxtaposed thereto and rotatable as a unit therewith. The smaller third gear 76, in turn, drives a large output drive gear 78 which is located within the enclosure member 21 of the housing 12.

Referring to FIGS. 1 and 4, a bellcrank lever 63 is pivoted upon the same axis as the parking brake lever 38 via a pivot bushing 80 which is in turn supported upon the bolt 44. The bellcrank lever 63 has a first arm 82 with an extension 84 at right angles therefrom and which is drivingly engageable with a face side 86 of the parking brake lever 38 when the parking brake is released, as shown in FIG. 1. The bellcrank lever 63 further includes a second arm portion 88 which extends downwardly relative to the pivot of the bellcrank lever 63 and which terminates in a cam surface 90.

Figure 2:
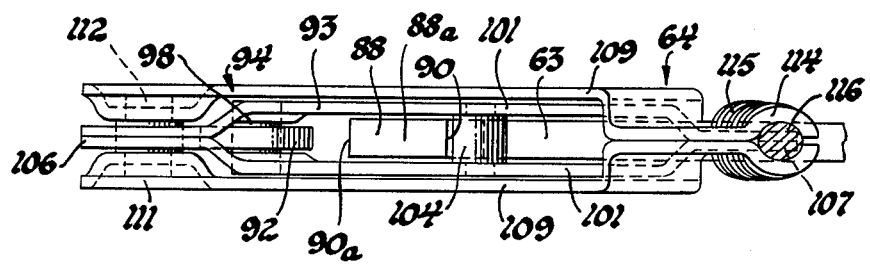
FIG. 2 is a cross-sectional view taken approximately along line 2—2 of FIG. 1.

With reference now to FIGS. 1 and 5, operating linkage 64 of control mechanism 10 generally includes first, second and third links 92, 93, and 94, respectively. The first link 92 has its upper end 95 pivotally secured by a pin 96 to the output drive gear 78 eccentrically of the axis thereof, while its other end 97 is pivotally connected at 98 with an upper portion 100 of the second link 93. Now referring to FIGS. 1 and 2, the second link 93 comprises a pair of similarly shaped and juxtaposed members 101 which carry centrally therebetween a roller cam 104. The second link 93 terminates in first and second ends 106 and 107. The third link 94 also comprises a pair of similarly shaped and juxtaposed members 109 which have the second link 93 located therebetween. The third link 94 has a first end 111 which is pivotally connected by a stud 112 with the first end 106 of the second link 93. The second end 114 of the third link 94 and the second end 107 of the second link 93 are biased apart by a coil spring 115 which has one end mounted on a headed adjustment screw 116 carried by the second end 114 of the third link 94 and which has its other end seated by a dimple 118 on the second end 107 of the second link 93, FIG. 1. The third link 94 also has an upper portion 119 which is pivotally supported on the bushing 80 and which receives the bellcrank lever 63 between its members 109. Thus, it should be understood that the parking brake lever 38, bellcrank lever 63, and third link 94 of the linkage 64 are pivotally supported upon a common axis.

The linkage 64, which is operatively connected as described above with the drive gear 78, is adapted to be driven during a first 180° of rotation of the latter from a first position, as shown in FIG. 1, to a second position, indicated in FIG. 1, wherein pin 96 is 180° displaced and link 92 is accordingly substantially upwardly displaced and links 93 and 94 are rotated clockwise substantially 60° about axis of pin 40. Similarly, the linkage 64 is adapted to be driven from such second position, back to its first position, as shown in FIG. 1, by a second 180° of rotation of the output drive gear 78. With reference to FIG. 1, it should be seen that when the linkage 64 is in its first position, as shown in FIG. 1, the roller cam 104 of the second link 93 is drivingly engaged with the cam surface 90 of the bellcrank lever 63. Thus, when the linkage 64, particularly links 93 and 94 are driven from their first position clockwise toward second position, the driving engagement between the roller cam 104 of the second link 93 and the cam surface 90 of the bellcrank lever 63 will cause the bellcrank lever 63 to pivot clockwise. Clockwise rotation of the bellcrank lever 63 causes the parking brake lever 38 to pivot in a clockwise manner by virtue of the driving engagement between the extension 84 of the bellcrank lever 63 and the face side 86 of the parking brake lever 38. As was previously described, the clockwise movement of the brake pedal lever 38, as the linkage 64 is driven from its first position toward its second position, causes the movable elements of the parking brake 11 to be moved against their spring load toward engagement with the stationary elements.

Referring to FIG. 7, the control circuit 66 provides for energization of the motor unit 60 to rotate the output drive gear 78 of the gear train 62 one full rotation or 360°. The control circuit 66 generally includes manually operable ground switch 120, a lock-in type relay switch 122, and a linkage controlled switch 124. The ground switch 120 is of the push button variety which is effective to close the circuit when manually depressed and to automatically open such circuit when manually released. The relay switch 122 includes a coil 126 and two normally open contact sets 128 and 129. The linkage controlled switch 124, also shown in FIGS. 5 and 6, is supported upon a flange 131 of the bracket arm 22 of the enclosure member 21. The switch 124 includes a plunger 133 which is spring biased toward a circuit closed position but which is engaged and maintained in a circuit open position by a flange 135 on the third link 94 when the linkage 64 is precisely in its first position, as shown in FIG. 1. The plunger 133 is moved by the spring bias to a circuit closed position, immediately when the flange 135 disengages the plunger 133 as the linkage 64 is driven from its first position. The linkage controlled switch 124, motor unit 60, and a power source 137, such as a battery of a vehicle, are all grounded. The ground switch 120 is connected in series with the power source 137 through the coil 126 of the relay 122. The ground switch 120 is also connected in series with the motor unit 60 through the coil 126 and the contact set 128 of the relay switch 122. The linkage controlled switch 124 is connected in series with the power source 137 through the contact set 129 and coil 126 of the relay switch 122. The motor unit 60 is connected in series with the power source 137 to the contact set 128 and coil 126 of the relay switch 122.

When the manually operable ground switch 120 is closed, a circuit is completed from the power source 137, through the coil 126 of the relay switch 122, through the ground switch 120 and to ground. Thus, the coil 126 of the relay switch 122 is energized and the sets of contacts 128 and 129 of the relay switch 122 are closed. When the contact set 128 of the switch 122 is closed, a circuit is completed from the power source 137, through the contacts 128, through the motor unit 60, and to ground. Thus, the motor unit 60 is energized and the output drive gear 78 is rotated and the linkage 64 is moved from its first position. Immediately as the linkage 64 is driven from its first position, the linkage controlled switch 124 is closed as was described above. Thereafter, the ground switch 120 can be manually released and the coil 126 of the relay switch 122 will remain energized through a circuit traced from the power source 137, through the coil 126, through the contacts 129, through the switch 124, and to ground. Thus, with the coil 126 energized, the contact sets 128 will remain closed to maintain the motor unit 60 energized through a circuit traced from a power source 137, through the contact set 128, through the motor unit 60, and to ground. As the output drive gear 78 reaches 360° rotation, the switch 124 is opened as the linkage 64 resumes its first position as was previously described. When the switch 124 is opened, the coil 126 of the relay switch 122 is deenergized and the contact set 128 opens to deenergize the motor unit 60. Thus, the output drive gear 78 is rotated 360° each time the motor 60 is energized by the vehicle operator closing the ground switch 120.

One feature of the present invention is that the power operator of the parking brake control mechanism 10, in one full cycle, moves the parking brake lever 38 to apply the parking brakes and is thereafter automatically reset for recycling before the parking brake lever 38 and parking brake 11 are released. As was previously described, the linkage 64 through the bellcrank lever 63 moves the parking brake lever 38 to apply the parking brake 11 as the linkage 64 is driven from its first position toward its second position by applying a predetermined force upon the parking brake lever 38 sufficient to overcome the spring load of the parking brake 11. However, because of the differences in brake adjustment and changes in brake characteristics over the life of the vehicle, the amount of movement of the parking brake lever 38 in response to the application of the predetermined force varies. For the power operator of the parking brake control mechanism 10 to move the parking brake lever 38 to an indefinite position to apply the parking brake and, for the power operator to complete its full cycle and thus be reset for recycling before release of the parking brake lever 38 and parking brake 11, the power operator must have provision for disconnecting from the parking brake lever 38 when the parking brake 11 is applied. Accordingly, the linkage 64 of the power operator is load responsive to be disconnected from driving relationship with the parking lever 38 when the parking brake 11 has been applied. More specifically, as the linkage 64 is driven from its first position, as shown in FIG. 1, toward its second position and the parking brake lever 38 is pivoted against the spring load of the parking brake 11, the increasing load on the parking brake lever 38 is transferred through the bellcrank lever 63 to the roller cam 104 of the second link 93 which is normally maintained in driving engagement with the cam surface 90 of the bellcrank lever 63 by the bias of the spring 115. The load on the parking brake lever 38, which increases with movement of the parking brake lever 38 to apply the parking brake 11, causes the roller cam 104 to roll downwardly upon the cam surface 90 of the bellcrank lever 63 and against the bias of the spring 115 which, of course, is being further compressed under the load. When the load on the parking brake lever 38 has increased to equal some predetermined force necessary to move the parking brake lever 38 to apply the parking brake 11, the spring 115 becomes predeterminedly sufficiently compressed to allow the roller cam 104 of the second link 93 to roll off the cam surface 90 of the bellcrank lever 63 and, thus, out of driving engagement with the bellcrank lever 63. Thus, the linkage 64 is disconnected from driving relationship with the parking brake lever 38 when the parking brake lever 38 has been moved with the predetermined force to apply the parking brake 11. Thereafter, the linkage 64 is driven to its second position, independently of bellcrank lever 63, with the roller cam 104 passing the underside 88a of the second arm portion 88 of the bellcrank lever 63. As the power operator begins its second half cycle in which the output drive gear 78 is rotated its second 180° and the linkage 64 is driven from its second position back toward its first position, the roller cam 104 of the second link 93 has traversed surface 88a and now engages the side 90a of the second arm portion 88 of the bellcrank lever 63 opposite the cam surface 90 and, with reference to FIG. 1, pivots the bellcrank lever 63 in a counterclockwise manner until the bellcrank lever 63 is relocated in its first position, as obtained at the beginning of the sequence, and restrained by a stop extension 140 on the enclosure member 21, FIGS 1 and 5. The brakes pedal lever is, of course, still in its applied position shown in broken lines. The roller cam 104 of the second link 93 is thus caused to roll down upon the underside 88a of the second arm extension 88 of the bellcrank lever 63 and the spring 115 is recompressed. As the output drive gear 78 reaches 360° of rotation, the roller cam 104 passes the underside 88a of the second arm portion 88 of the bellcrank lever 63 and the spring 115 expands and biases the second link 93 upwardly and causes the roller cam 104 to again move into driving engagement with the cam surface 90. Thus, the power operator of the parking brake control mechanism 10, after one full cycle, is reset for recycling before the parking brake lever 38 and parking brake 11 are released.

Summarizing the operation of the power operator and assuming it to be in the condition of FIG. 1, when the vehicle operator manually closes the ground switch 120 to energize the motor unit 60, the motor unit drives the output drive gear 78 through the gear train 62 in a clockwise rotation. The output drive gear 78 in turn drives the linkage 64 from its first position toward its second position. The linkage 64 pivots the bellcrank lever 63 in clockwise direction and in turn the bellcrank lever 63 rotates the parking brake lever 38 in a clockwise manner. When the load on the parking brake lever 38 has increased to equal the predetermined force required to move the parking brake lever 38 to apply the parking brake 11 and the parking brake 11 has been applied, the roller cam 104 of the second link 93 of the linkage 64 disengages the cam surface 90 of the bellcrank lever 63 and the linkage 64 is disconnected from a driving relationship with the bellcrank lever 63 and the parking brake lever 38. As the output drive gear 78 approaches 180° of rotation, the linkage 64 reaches its second position. As the output drive gear 78 starts its second 180° rotation, the linkage 64 is driven from its second position back toward its first position and the roller cam 104 of the second link 93 engages and pivots the bellcrank lever 63 in a counterclockwise manner until the bellcrank lever 63 is restrained by the stop extension 140. As the output drive gear 78 completes its second 180° of rotation and the linkage 64 reaches its first position, the roller cam 104 is biased back into driving engagement with the cam surface 90 of the bellcrank lever 63. Further, as the linkage 64 reaches its first position, the flange 135 of the third link 94 engages the plunger 133 of the switch 124 and moves the switch 124 into its circuit open position to deenergize the motor 60. Thus, the power operator of the parking brake control mechanism 10, after one full cycle, is reset for recycling before the parking brake lever 38 and parking brake 11 have been released. The parking brake 11 is released by manual manipulation by the vehicle operator of the control link 57 which causes the pawl 55 to disengage the ratchet member 54 and allow the parking brake lever 38 to be returned to its released position, shown in FIG. 1.

The foregoing disclosure relates to only one embodiment of the invention which may be modified within the scope of the appended claims.

What is claimed is:

1. In a vehicle including a parking brake system wherein predetermined force is required to apply the vehicle brakes, a parking brake actuator for supplying said predetermined force, comprising, a support, a lever pivotally mounted on said support for movement between a brake released position and any of a plurality of brake applied positions, power-operated drive means operative in a fixed range of movement thereof in an actuating direction from a first position, corresponding generally to the released position of said lever, to a second position, corresponding generally to a brake applied position of said lever, and in an opposite resetting direction from said second to said first position, said drive means including means operative to transfer movement of said drive means in said actuating direction into movement of said lever from its brake released position to a brake applied position wherein said lever exerts said predetermined force on said parking brake system, said operative means being further operative upon the occurrence of exertion of said predetermined force by said lever to disengage said drive means from said lever whereby said drive means completes any remainder of its movement in said actuating direction and thereafter its movement in said resetting direction independently of further movement of said lever, and circuit means including a source of power for selectively energizing said power-operated unit for movement thereof in said actuating direction and then in said resetting direction between said positions thereof.

2. In a vehicle including a parking brake system wherein predetermined force is required to apply the vehicle brakes, a parking brake actuator for supplying said predetermined force, comprising, a support, a lever pivotally mounted on said support for movement between a brake released position and any of a plurality of brake applied postion, power-operated drive linkage operative in a fixed range of movement including movement thereof in an actuating direction from a first position to a second position and in an opposite resetting direction from said second to said first position, load responsive means operative to drivingly engage said drive linkage during movement thereof in said actuating direction, with said lever to forcibly move the latter from its brake released to a brake applied position wherein said lever exerts said predetermined force on said parking brake system, said load responsive means being further operative to disengage said drive linkage from said lever upon the occurrence of exertion of said predetermined force by said lever whereby said drive linkage completes any remainder of its movement in said actuating direction and thereafter its movement in said resetting direction independently of further movement of said lever, and circuit means including a source of power for selectively energizing said drive linkage for movement thereof in said actuating direction and then in said resetting direction between said positions thereof.

3. In a vehicle having a parking brake system, the combination comprising: a brake lever pivotally supported upon a housing for movement under application of a predetermined force from a released position to any of a plurality of actuated positions to apply the parking brake and adapted for return movement to release the parking brake; a cyclical power operator including a drive lever rotatably supported upon said housing for driving engagement with said brake lever during rotation in one direction, said drive lever having a cam surface, said cyclical power operator further including linkage adapted to be driven from a first position to a second position in a first half cycle of operation of said power operator and from said second position back to said first position in a second half cycle of operation of said power operator, said linkage further including a link and spring means biasing said link into driving engagement with said cam surface of said drive lever when said linkage is in its first position, said linkage being operative to rotate said drive lever in said one direction to move said brake lever to apply the predetermined force necessary to apply the parking brake when said linkage is driven from its first position toward its second position in said first half cycle of operation of said power operator, said link overcoming the bias of said spring means upon the application of said predetermined force thereby to disengage said cam surface of said drive lever whereby said linkage completes any remainder of movement thereof from its first to its second position disconnected from driving engagement with said drive lever and said brake lever as said cyclical power operator completes its first half cycle of operation and thereafter movement from its second to its first position in its second half cycle of operation likewise independently of movement of said brake lever, said linkage during said second half cycle of operation of said power operator being operative to rotate said drive lever in a direction opposite said one direction to reposition said drive lever ready for reengagement with said brake lever; and circuit means including a source of power responsive to manual selection to energize said cyclical power operator for one full cycle of operation and thereafter deenergize said cyclical power operator whereby said cyclical power operator is set for manually selected recycling before return movement of said brake lever during release of the parking brake.

4. In a vehicle having a parking brake system, the combination comprising: a foot pedal lever pivotally supported upon a housing for movement upon application of a predetermined force to apply the parking brake and adapted for return movement to release the parking brake; ratchet means for normally preventing return movement of the lever to release the parking brake once the parking brake has been applied and being releasable by the vehicle operator to allow return movement of the foot pedal lever; a motor; a gear train driven by said motor and reducing the output speed therefrom, said gear train having an output drive gear; a bellcrank lever pivotally supported upon said housing and drivingly engageable with said brake lever pivoted in one direction, said bellcrank lever having a cam surface; a linkage adapted to be driven between a first position and a second position, said linkage having a first link pivotally connected with said output drive gear, said linkage having a second link pivotally connected with said first link and having a roller cam, said linkage having a third link pivotally connected with said second link and also pivotally connected with said housing, a spring carried between said second and third links and biasing said second and third links apart, said linkage when in its first position having said roller cam of said second link biased by said spring into driving engagement with said cam surface of said bellcrank lever, said linkage when driven from its first position toward its second position being operative to pivot said bellcrank lever to move said foot pedal lever to apply the parking brake, said second link overcoming the bias of said spring and said roller cam disengaging said cam surface of said bellcrank lever when the parking brake is applied, said linkage thereafter being driven to its second disconnected from driving engagement with said bellcrank lever, said linkage when returning from its second position toward its first position having said roller cam engage said bellcrank lever to pivot said bellcrank lever out of driving engagement with said foot pedal lever and upon return to its second position having said roller cam of said second link again biased by said spring back into driving engagement with said cam surface of said bellcrank lever; and circuit means including a source of power for energizing said motor to cycle said linkage from its first position to its second position and back to its first position without stop and thereafter deenergizing said motor.

* * * * *